United States Patent
Hong

(10) Patent No.: US 10,915,098 B2
(45) Date of Patent: Feb. 9, 2021

(54) OBJECT CONTROLLER

(71) Applicant: YooJung Hong, Yongin-si (KR)

(72) Inventor: YooJung Hong, Yongin-si (KR)

(73) Assignee: YooJung Hong, Yongin-si (KR)

( * ) Notice: Subject to any disclaimer, the term of this patent is extended or adjusted under 35 U.S.C. 154(b) by 0 days.

(21) Appl. No.: 15/532,073

(22) PCT Filed: Feb. 24, 2017

(86) PCT No.: PCT/KR2017/002083
§ 371 (c)(1),
(2) Date: Jan. 25, 2018

(87) PCT Pub. No.: WO2017/146531
PCT Pub. Date: Aug. 31, 2017

(65) Prior Publication Data
US 2018/0164799 A1    Jun. 14, 2018

(30) Foreign Application Priority Data

Feb. 24, 2016 (KR) .......................... 10-2016-0022135

(51) Int. Cl.
*G05B 11/01* (2006.01)
*G05D 1/00* (2006.01)
(Continued)

(52) U.S. Cl.
CPC ........... *G05D 1/0016* (2013.01); *A63H 27/12* (2013.01); *A63H 30/00* (2013.01); *A63H 30/04* (2013.01);
(Continued)

(58) Field of Classification Search
CPC .. B64C 2201/146; B64C 39/024; G05D 1/00; G05D 1/0016; G05D 1/0044;
(Continued)

(56) References Cited

U.S. PATENT DOCUMENTS 4,491,325 A    1/1985    Bersheim
5,286,024 A    2/1994    Winblad
(Continued)

FOREIGN PATENT DOCUMENTS

JP    S63-184129 A    7/1988
JP    07-028598    5/1995
(Continued)

OTHER PUBLICATIONS

International Search Report, dated May 25, 2016, for International Patent Application No. PCT/KR2015/014573, filed Dec. 31, 2015, 2 pages.
(Continued)

*Primary Examiner* — Naomi J Small
(74) *Attorney, Agent, or Firm* — Weaver Austin Villeneuve & Sampson LLP

(57) ABSTRACT

The present invention relates to an object controller capable of controlling a movement and a rotation of an object. The present invention provides an object controller capable of controlling a motion of an object, the object controller including: a main body; an operating unit which is in non-contact with the main body; and a control unit which controls a motion of the object based on a relative position of the operating unit to the main body.

25 Claims, 15 Drawing Sheets

(51) Int. Cl.
  *G06F 3/0362* (2013.01)
  *A63H 30/04* (2006.01)
  *A63H 30/00* (2006.01)
  *A63H 27/00* (2006.01)
  *G06F 3/02* (2006.01)
  *G06F 3/01* (2006.01)
  *B64C 39/02* (2006.01)
  *G05D 1/10* (2006.01)

(52) U.S. Cl.
  CPC .......... *G05D 1/0044* (2013.01); *G06F 3/017* (2013.01); *G06F 3/02* (2013.01); *G06F 3/0362* (2013.01); *B64C 39/024* (2013.01); *B64C 2201/146* (2013.01); *G05D 1/102* (2013.01); *G06F 2203/0331* (2013.01); *G06F 2203/0384* (2013.01)

(58) Field of Classification Search
  CPC .......... G05D 1/102; G06F 2203/0331; G06F 2203/0384; G06F 3/017; G06F 3/02; G06F 3/0362
  USPC ........................................... 340/12.5
  See application file for complete search history.

(56) References Cited

U.S. PATENT DOCUMENTS

| | | | | |
|---|---|---|---|---|
| 5,489,922 | A * | 2/1996 | Zloof | G06F 3/0362 345/156 |
| 5,532,529 | A | 7/1996 | Codina | |
| 5,559,432 | A | 9/1996 | Logue | |
| 5,589,828 | A | 12/1996 | Armstrong | |
| 5,687,424 | A | 11/1997 | Masley | |
| 5,854,622 | A | 12/1998 | Branon | |
| 6,154,198 | A | 11/2000 | Rocenberg | |
| 6,160,537 | A | 12/2000 | Liu | |
| 6,232,959 | B1 | 5/2001 | Pedersen | |
| 6,373,466 | B2 | 4/2002 | Salcudean | |
| 6,522,320 | B1 * | 2/2003 | Chou | G06F 3/0338 178/18.01 |
| 6,670,947 | B2 * | 12/2003 | Smyth | G06F 3/03549 345/156 |
| 6,741,233 | B1 | 5/2004 | Swan | |
| 7,463,241 | B2 | 12/2008 | Ushimaru | |
| 8,258,917 | B2 * | 9/2012 | Cai | G06F 3/0346 340/4.13 |
| 8,314,772 | B1 * | 11/2012 | Coe | G06F 3/03543 345/163 |
| 10,228,688 | B2 | 3/2019 | Hong | |
| 2002/0104921 | A1 | 8/2002 | Louvel | |
| 2002/0190948 | A1 | 12/2002 | Coutant | |
| 2004/0003985 | A1 | 1/2004 | Nichimoto | |
| 2005/0035942 | A1 * | 2/2005 | Ruiz | G06F 3/03547 345/156 |
| 2005/0162389 | A1 | 7/2005 | Obermeyer | |
| 2006/0137931 | A1 | 6/2006 | Berg et al. | |
| 2006/0262000 | A1 * | 11/2006 | Strong | G08C 17/00 341/176 |
| 2007/0164150 | A1 | 7/2007 | Van de Rostyne | |
| 2008/0278448 | A1 | 11/2008 | Nilsagard et al. | |
| 2009/0005167 | A1 | 1/2009 | Arrasvuori et al. | |
| 2010/0144436 | A1 * | 6/2010 | Marks | G06F 3/0383 463/36 |
| 2013/0135223 | A1 * | 5/2013 | Shai | G06F 3/014 345/173 |
| 2013/0293362 | A1 | 11/2013 | Parazynski | |
| 2013/0294016 | A1 | 11/2013 | Wilson et al. | |
| 2014/0008496 | A1 * | 1/2014 | Ye | B64C 13/20 244/190 |
| 2014/0018976 | A1 * | 1/2014 | Goossen | G05D 1/0022 701/2 |
| 2014/0099853 | A1 | 4/2014 | Condon et al. | |
| 2014/0247119 | A1 | 9/2014 | Robbins et al. | |
| 2014/0379178 | A1 * | 12/2014 | Goossen | G05D 1/102 701/15 |
| 2016/0018843 | A1 | 1/2016 | Lopez | |
| 2017/0193813 | A1 * | 7/2017 | Carroll | G05D 1/0016 |
| 2017/0269587 | A1 | 9/2017 | Hong | |
| 2019/0137994 | A1 | 5/2019 | Hong | |
| 2019/0354097 | A1 | 11/2019 | Hong | |

FOREIGN PATENT DOCUMENTS

| | | |
|---|---|---|
| JP | 11-154031 | 6/1999 |
| JP | 2006-236163 A | 9/2006 |
| JP | 2006-309500 A | 11/2006 |
| JP | 2012-503244 A | 2/2012 |
| JP | 2013-521571 A | 6/2013 |
| JP | 2013-139256 A | 7/2013 |
| JP | 2014-513371 A | 5/2014 |
| JP | 2015-009709 A | 1/2015 |
| KR | 10-2005-0001933 A | 1/2002 |
| KR | 10-2005-0021500 A | 3/2005 |
| KR | 2015-0093270 A | 8/2015 |
| WO | 2015-102175 A1 | 7/2015 |
| WO | 2017-039081 A1 | 3/2017 |
| WO | 2017-146531 | 8/2017 |

OTHER PUBLICATIONS

Grant of Patent, dated Aug. 23, 2016, for Korean Patent Application No. 10-2015-0125489, filed Sep. 4, 2015, 1 page.
U.S. Appl. No. 15/532,068, filed May 31, 2017, YooJung Hong.
Office Action for Korean Patent Application No. KR10-2016-0022135, dated Feb. 13, 2018, with English Machine Translation.
Final Rejection for Korean Patent Application No. 10-2018-0090832, dated Jun. 5, 2018. [with Machine Translation].
Office Action for Korean Patent Application No. 10-2018-0090832, dated Aug. 21, 2018. [with Machine Translation].
Non-Final Rejection, dated Apr. 12, 2018, for U.S. Appl. No. 15/532,068.
International Search Report, dated May 23, 2017, for International Patent Application No. PCT/KR2017/002083, filed Feb. 24, 2017, 4 pages (in Korean).
Notice of Allowance, dated Oct. 24, 2018, for U.S. Appl. No. 15/532,068.
Letter dated Dec. 17, 2018, from C. Scott Talbot of Cooley, LLP, to Ryan J. Otis of Weaver Austin Villeneuve & Sampson LLP.
Supplemental Notice of Allowability, dated Jan. 24, 2019, for U.S. Appl. No. 15/532,068.
Final Rejection, dated Mar. 20, 2020, for U.S. Appl. No. 16/241,738.
Notification of Reason for Refusal, for Korean Patent Application No. KR10-2018-0090832, dated Apr. 28, 2020, with English Machine Translation.
Non-Final Rejection, dated Mar. 21, 2019, for U.S. Appl. No. 16/241,738.
Final Rejection, dated Aug. 16, 2019, for U.S. Appl. No. 16/241,738.
Advisory Action, dated Nov. 6, 2019, for U.S. Appl. No. 16/241,738.
Non-Final Rejection, dated Nov. 1, for U.S. Appl. No. 16/510,868.
Non-Final Rejection, dated Nov. 27, 2019, for U.S. Appl. No. 16/241,738.
First Office Action for counterpart JP Patent Application No. 2018-545176, dated Sep. 12, 2019. [with Machine Translation].
Extended European Search Report for counterpart EP Patent Application No. 17724308.6, dated Oct. 8, 2019.

* cited by examiner (a)

(b)

(c)

OBJECT CONTROLLER

TECHNICAL FIELD

The present invention relates to an object controller, and more specifically, to an object controller capable of controlling a movement and a rotation of an object.

BACKGROUND ART

A drone or unmanned aerial vehicle (UAV) refers to a flight vehicle that flies by being operated in a wireless manner without a human aboard. A multi-copter drone has been initially developed for the military purpose, but because of convenience in transportation and storage, the drone is widely used to capture videos for broadcasting, and recently, the drone (unmanned flight vehicle) becomes commercially available. Because a fuselage of the drone is light in weight, the drone is conveniently and quickly carried and has excellent economic feasibility, and as a result, the drone is utilized for aerial photography, low-altitude reconnaissance patrol, and the like.

In addition, the drone is utilized in various fields in order to capture videos by using a camera at a location which it is difficult for a human to access, or to deliver an object by loading the object on the drone and moving the drone. In addition, a number of researches are being conducted to use the drone for monitoring disasters and transporting products.

Recently, the drone is in the limelight even in leisure and sports fields in which general users carry the drones and use the drones for aerial photography by using cameras. The drone becomes light in weight and small in size in comparison with the related art, and in some instances, a high-performance small camera is mounted on the drone.

Since the drone is an unmanned flight vehicle without a human aboard, the drone is operated by receiving operating signals in a wireless manner from a user typically on the ground surface. The most of the drones up to now are operated by manual operations that require a manipulation of a human.

FIG. 1 is a conceptual view illustrating an example of the existing drone control device.

Referring to FIG. 1, forward and rearward movements, left and right movements, left and right turning, and upward and downward movements of the drone may be controlled by using both left and right sticks.

However, this control method degrades intuition, and as a result, the user needs to perform a lot of practices so as to freely control the drone. In addition, the control method becomes complicated as precise control such as stunt flying becomes enabled because of development on the drone.

In other words, a controller in the related art for operating the drone is typically controlled by the user in a state in which the user holds the controller. In addition, it is difficult to operate the drone, which causes a high barrier to use the drone. For this reason, the drones are classified in terms of type into beginner, intermediate, and expert levels and one sale. In addition, the drone uses spend much time to operate the drones in order to operate the drone well.

However, as the utilization field of the drone is expanded to the leisure and sports fields, there is a need for a drone controller that enables a user with no training in operating the drone to more conveniently and intuitively operate the drone.

DISCLOSURE

Technical Problem

The present invention has been made during the research process, and an object of the present invention is to provide a drone controller that enables a user to easily operate the drone controller with one hand instead of operating the drone controller by holding the drone controller with two hands.

In addition, another object of the present invention is to provide a drone controller that enables a user to more intuitively operate the drone controller when moving the drone upward, moving the drone downward, moving the drone, and rotating the drone.

Technical problems of the present invention are not limited to the aforementioned technical problems, and other technical problems, which are not mentioned above, may be clearly understood by those skilled in the art from the following descriptions.

Technical Solution

To solve the aforementioned technical problems, an object controller capable of controlling a motion of an object according to an exemplary embodiment of the present invention includes: a main body; an operating unit which is in non-contact with the main body; and a control unit which is disposed in the main body, and controls a motion of the object based on a relative position of the operating unit to the main body.

According to the exemplary embodiment of the present invention, the main body may be formed to enable a user to easily hold the main body.

According to the exemplary embodiment of the present invention, a display may be disposed on an upper portion of the main body, and the display may display a position and a travel direction of the operating unit.

According to the exemplary embodiment of the present invention, an upper portion of the main body may convexly protrude toward the outside so as to form a support surface.

According to the exemplary embodiment of the present invention, the operating unit may be movably supported on the support surface, and the support surface may be pushed when the support surface is pressed at a predetermined pressure or higher toward a central portion of the main body.

According to the exemplary embodiment of the present invention, the main body may include an anti-withdrawal projection which protrudes on the support surface along a circumference of the upper portion of the main body.

According to the exemplary embodiment of the present invention, the main body may include a user input unit which enables the user to input a signal so as to perform another control on the object in addition to the operation according to a relative position between the operating unit and the main body.

According to the exemplary embodiment of the present invention, the control unit may set a relative initial position (zero point) between the operating unit and one surface of the main body based on the user's preset input inputted to the user input unit.

According to the exemplary embodiment of the present invention, the control unit may set a relative initial position of the operating unit to the main body, and may perform and store linear calibration on at least one of an X-axis, a Y-axis, and a Z-axis in respect to a motion of the operating unit that moves based on the relative initial position in accordance with a preset input.

According to the exemplary embodiment of the present invention, the control unit may generate a signal for moving the object based on a displacement between the operating unit and one side of the main body based on an initial position set value and a reference value made by performing calibration.

According to the exemplary embodiment of the present invention, the control unit may divide a displacement degree between the operating unit and one side of the main body into two or more regions or linearly receives the displacement degree, and may generate a signal having the same magnitude for displacing the object when the operating unit is positioned in one of the respective regions.

According to the exemplary embodiment of the present invention, when a displacement with respect to one axis, among the X-axis, the Y-axis, and the Z-axis of the operating unit, is greater than displacements with respect to the remaining two axes by a preset range or larger, the control unit may set displacement values with respect to the two axes of the object to 0.

According to the exemplary embodiment of the present invention, the control unit may decrease or increase a ratio to a magnitude which displaces the object which occurs in respective regions based on the user's preset input to the user input unit.

According to the exemplary embodiment of the present invention, the control unit may generate at least one of an acoustic signal, a visual signal, and tactile signal which vary in accordance with a signal generated to control the object in order to enable the user to easily recognize a magnitude of a signal for controlling the object.

According to the exemplary embodiment of the present invention, the control unit may generate a signal for maintaining the object at the current position when the operating unit and the upper portion of the main body deviate from a preset displacement or greater or external force at preset pressure or higher is applied to the main body.

According to the exemplary embodiment of the present invention, the main body may include an accommodating space which accommodates the operating unit.

According to the exemplary embodiment of the present invention, the accommodating space may be formed in the main body so as to accommodate the operating unit or formed outside the main body so that the operating unit is detachably fitted with the accommodating space.

According to the exemplary embodiment of the present invention, the main body may include a connecting member which is formed on an upper surface of the main body and coupled to the operating unit so that the operating unit is not withdrawn from the main body while the operating unit is in operation.

According to the exemplary embodiment of the present invention, the user input unit may include at least one of a scroll button, a wheel button, a slide button, and a push button.

According to the exemplary embodiment of the present invention, the control unit may generate a signal for rotating the object based on the user's preset input to the user input unit.

According to the exemplary embodiment of the present invention, the operating unit may include, so as to be attached to and detached from the user's finger, at least one of a holding means which is held by the user's finger while pressing the user's finger by using restoring force so as to be attached to or detached from any one of the user's fingers, a tightening means which is tightened in accordance with a thickness of the user's finger, and a fitting means into which the finger is inserted.

According to the exemplary embodiment of the present invention, the object controller may further include a communication module which transmits and receives information about the object, information about a control signal, and a signal for setting the main body to and from an external terminal.

According to the exemplary embodiment of the present invention, the main body may further include a display which displays information about the object, information about a control signal, and a signal for setting the main body.

According to the exemplary embodiment of the present invention, the control unit may include a sync function for setting a control signal of the main body so that the control unit communicates with other objects so as to control a new object based on the user's preset input.

According to the exemplary embodiment of the present invention, the object may be at least one of drones, unmanned aerial vehicles, manned aerial vehicles, game consoles, objects in computer programs, and vehicles.

According to the exemplary embodiment of the present invention, a relative position of the operating unit to the main body may be detected by using a position sensor.

Other detailed matters of the exemplary embodiment are included in the detailed description and the drawings.

Advantageous Effects

According to at least one of the exemplary embodiments of the present invention, a motion of a three-dimensional moving object such as a drone may be controlled only by operating the controller, and as a result, it is possible to provide intuition to a user.

In addition, the moving object may be precisely controlled, and accuracy in controlling the moving object may be improved.

The additional scope of the applicability of the present invention will be clear from the following detailed description. However, various modifications and alterations within the spirit and the scope of the present invention may be clearly understood by those skilled in the art, and thus it should be understood that the particular exemplary embodiments such as the detailed description and the exemplary embodiments of the present invention are provided only for illustrative purposes.

BEST MODE

Figure 1:
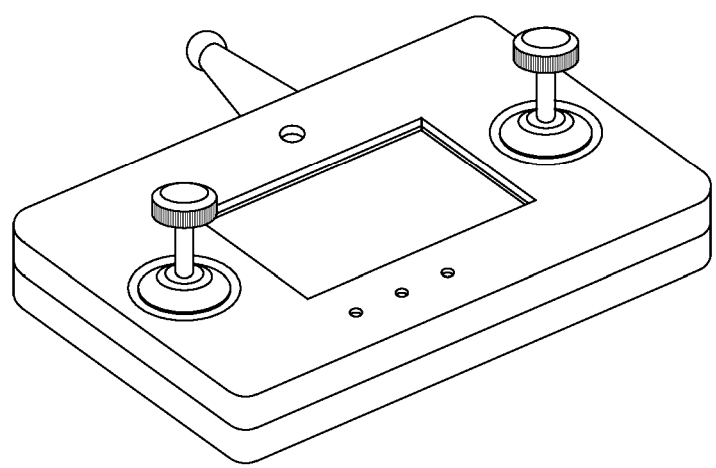
FIG. 1 is a schematic view illustrating an exemplary embodiment of an object controller in the related art.

Advantages and features of the present invention and methods of achieving the advantages and features will be clear with reference to exemplary embodiments described in detail below together with the accompanying drawings. However, the present invention is not limited to exemplary embodiment disclosed herein but will be implemented in various forms. The exemplary embodiments are provided so that the present invention is completely disclosed, and a person of ordinary skilled in the art can fully understand the scope of the present invention. Therefore, the present invention will be defined only by the scope of the appended claims.

The shapes, sizes, ratios, angles, numbers, and the like illustrated in the accompanying drawings for describing the exemplary embodiments of the present invention are merely examples, and the present invention is not limited thereto. Further, in the following description, a detailed explanation of known related technologies may be omitted to avoid unnecessarily obscuring the subject matter of the present invention. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are used only to distinguish one constituent element from another constituent element. Therefore, a first component to be mentioned below may be a second component in a technical concept of the present invention.

Throughout the specification, the same reference numerals denote the same constituent elements.

The size and thickness of each component illustrated in the drawings are shown for ease of description, but the present invention is not necessarily limited to the size and thickness of the illustrated component.

Respective features of several exemplary embodiments of the present invention may be partially or entirely coupled to or combined with each other, and as sufficiently appreciated by those skilled in the art, various technical cooperation and operations may be carried out, and the respective exemplary embodiments may be implemented independently of each other or implemented together correlatively.

Hereinafter, various exemplary embodiments of the present invention will be described in detail with reference to the accompanying drawings.

Figure 2:
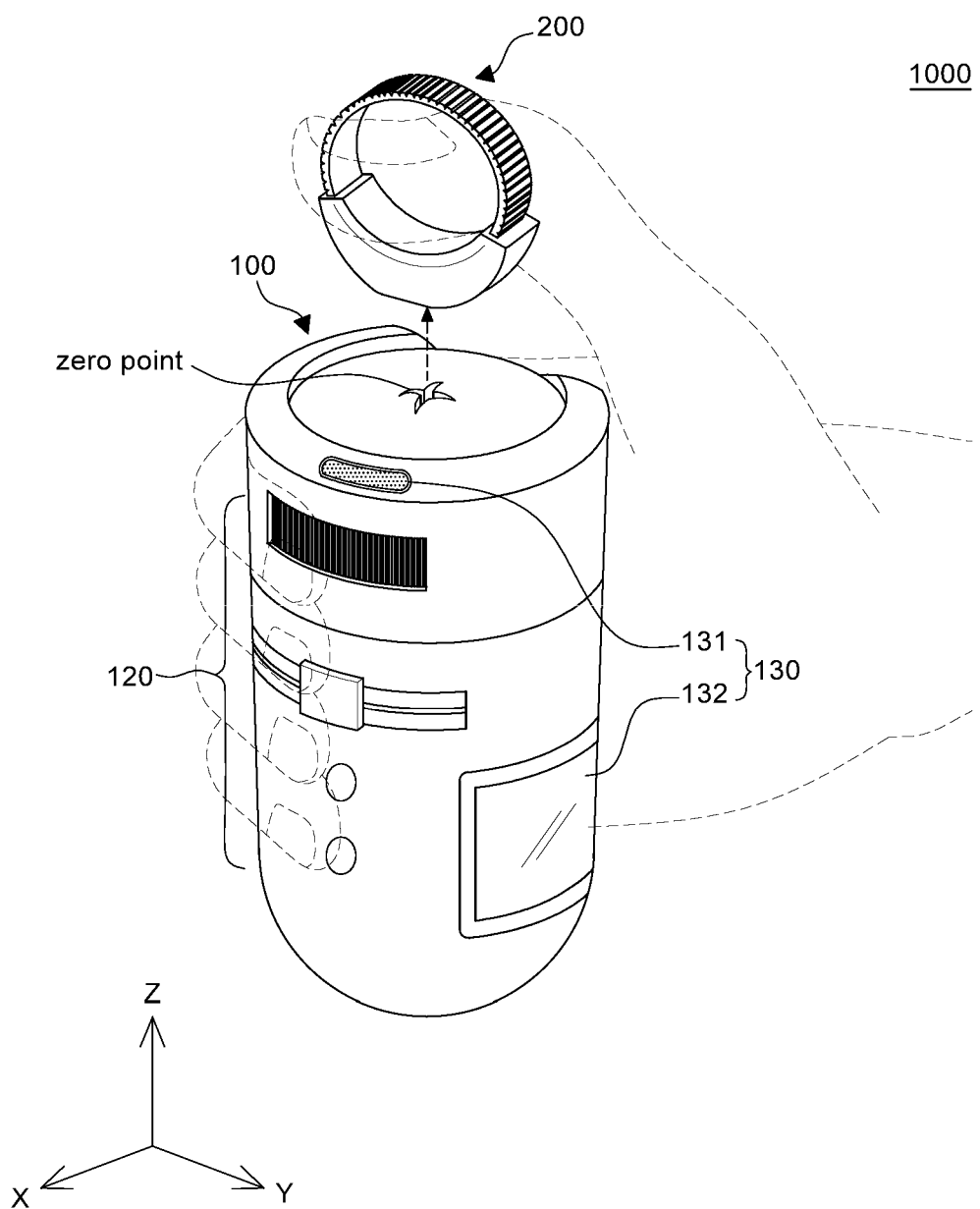
FIG. 2 is a perspective view for explaining an object controller according to an exemplary embodiment of the present invention.
Figure 3:
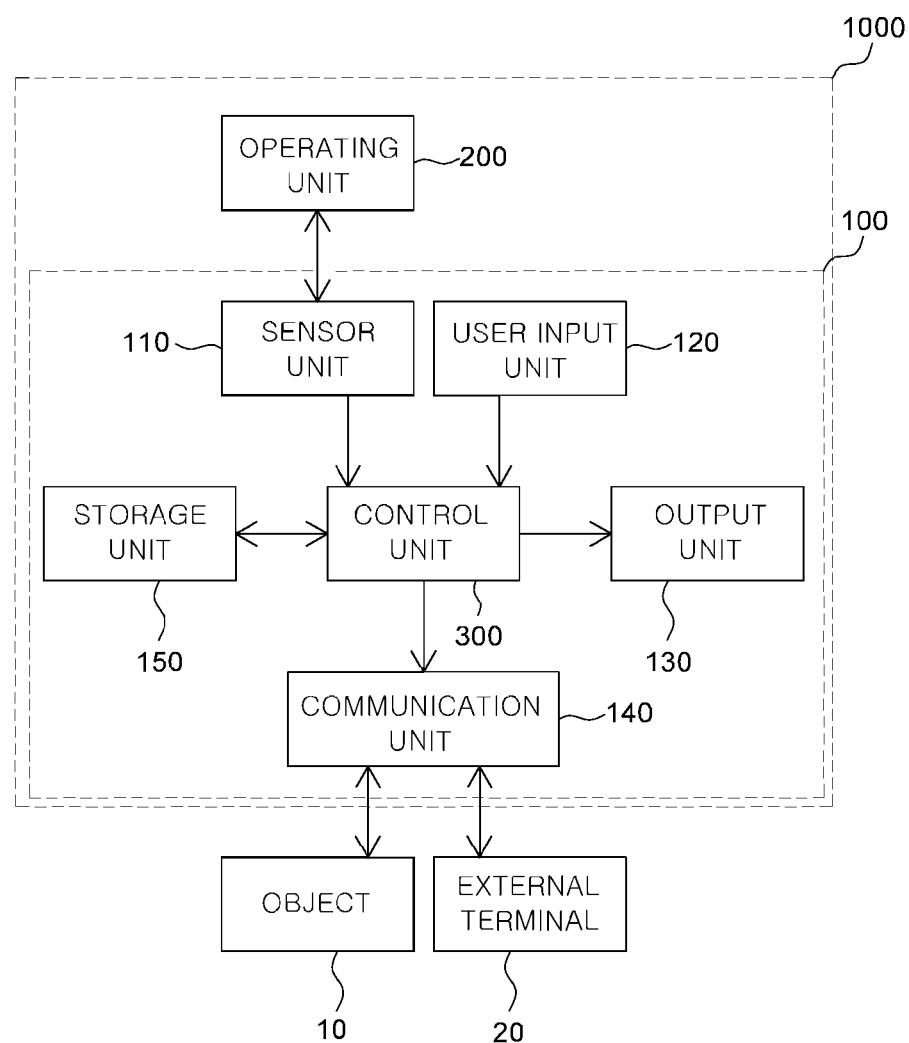
FIG. 3 is a block diagram for explaining the object controller according to the exemplary embodiment of the present invention.

FIG. 2 is a perspective view for explaining an object controller according to an exemplary embodiment of the present invention. FIG. 3 is a block diagram for explaining the object controller according to the exemplary embodiment of the present invention.

An object controller 1000 of the present invention may control a motion of an object 10 to be controlled. Here, as the object 10 to be controlled, there are various objects such as drones, unmanned aerial vehicles, manned aerial vehicles, game consoles, objects in computer programs, and vehicles. However, in the present exemplary embodiment, the description will be made based on the drone.

Referring to FIGS. 2 and 3, the object controller 1000 includes a main body 100, an operating unit 200, and a control unit 300 which are operated in a state in which the main body 100, the operating unit 200, and the control unit 300 are not in contact with one another.

The main body 100 includes a sensor unit 110, a user input unit 120, an output unit 130, a communication unit 140, and a storage unit 150. In addition, the control unit 300 may be disposed in the main body 100. Meanwhile, a mark may be formed on a surface of an upper portion of the main body 100 so as to guide a region in which the operating unit 200 is disposed to be spaced apart from the upper portion of the main body 100 in a vertical direction.

The sensor unit 110 may be disposed an inner side close to one surface of the main body 100, specifically, an upper surface of the main body 100. The sensor unit 110, which is disposed in the main body 100, may measure a relative displacement with another sensor included in the operating unit 200. Based on the measured displacement, the control unit 300 may determine an operating signal to be transmitted to the object 10.

The user input unit 120 is disposed on the main body 100 so that a user may input a signal so as to perform another control on the object 10 in addition to the operation according to a relative position between the operating unit 200 and the main body 100. Specifically, the user input unit 120 may be used to input an operating signal for the object 10 which is not determined by a relative displacement between the operating unit 200 and the main body 100, calibrate a signal which is determined by a relative displacement between the operating unit 200 and the main body 100, or adjust a size and a ratio of a signal which is determined by a relative displacement between the operating unit 200 and the main body 100. An operating signal for the object 10 which is not determined by a relative displacement between the operating unit 200 and the main body 100 may be a signal for rotating the object 10.

Meanwhile, the user input unit 120 may be formed on a front surface of the main body 100 so that the user's fingers except for the thumb are disposed on the user input unit 120. However, the present invention is not limited thereto, and the user input unit 120 may be formed at other positions of the main body 100, or may be formed on the operating unit 200.

Further, the user input unit 120 may include at least one of a scroll button, a wheel button, a slide button, and a push button. Based on the drawing, the button positioned at an uppermost side is a wheel button, a slide button is positioned below the wheel button, and a push button is positioned below the slide button.

The output unit 130 means a configuration for outputting various signals generated by the control unit 300 so that the user may recognize the signals. The object controller 1000 may be used to guide the instructions through the output unit 130, or allow the user to recognize the type or a magnitude of a signal transmitted to the object 10. For example, the output unit 130 may be a light source such as an LED which emits light, a speaker 131 which outputs sound, a vibration module which vibrates the main body 100, and the like.

Meanwhile, a display 132 is one of the output unit 130. The display 132 may be disposed on the main body 100 so that the user may visually recognize the display 132. The display 132 may display information about the object 10, information about a control signal, and a signal for setting the main body 100.

The communication unit 140 may transmit and receive information about the object 10, information about a control signal, and a signal for setting the main body 100 to and from an external terminal 20. That is, the communication unit 140 may communicate with the object 10 of which the operation is controlled by the object controller 1000, or communicate with the external terminal 20 which may set or display information about the main body 100 and/or the object 10.

The storage unit 150 may store a relative initial position between the main body 100 and the operating unit 200 which is measured by the control unit 300, or calibration which is measured when the user performs an operation test based on the operating unit 200. In addition, the storage unit 150 may store signal systems, programs, and the like which may be used when the object controller 1000 operates other types of objects 10, for example, drones, unmanned aerial vehicles, manned aerial vehicles, game consoles, objects in computer programs, and vehicles.

The main body 100 may be formed to be held by a user with one hand. Referring to FIG. 2, the user may use the object controller 1000 with one hand. Specifically, the user may attach the operating unit 200 to the thumb, and may hold the main body 100 by using the remaining four fingers and the palm. The user may more easily control the object 10 with one hand by holding the object controller 1000 as described above. Meanwhile, the present invention is not limited to the aforementioned description, it is possible to use the operating unit 200 in a state in which the main body 100 is disposed on a floor or the like, or use the operating unit 200 with one hand by holding the main body 100 with the other hand.

The operating unit 200 may not be in contact with the main body 100, and the operating unit 200 may be moved in a state of being spaced apart from the main body 100. In this case, the control unit 300 may move the object 10 based on a relative position between the main body 100 and the operating unit 200.

The operating unit 200 may be attached to the user's hand. Specifically, referring to FIG. 2, the operating unit 200 may be attached to the user's thumb. The operating unit 200 may be formed in a ring shape, but the shape of the operating unit 200 is not limited to the ring shape, and it is sufficient as long as any means, which may be attached to the user's hand, is provided. The operating unit 200 will be specifically described with reference to FIG. 8.

Meanwhile, a relative position between the operating unit 200 and the main body 100 may be detected by using a 3D magnetic sensor. Specifically, the 3D magnetic sensor may be embedded in the main body 100, and a magnet is embedded in the operating unit 200, such that the displacements of the main body 100 and the operating unit 200 may be recognized. In addition, a position sensor capable of detecting a relative position between the operating unit 200 and the main body 100 may be at least one of an acceleration sensor, a magnetic sensor, an impedance sensor, a hybrid sensor related to an impedance sensor and a magnetic sensor, a hybrid sensor, a gravity sensor (G-sensor), a gyroscope sensor, a motion sensor, an infrared (IR) sensor, an ultrasonic sensor, an optical sensor (e.g., camera).

The control unit 300 is disposed in the main body 100, and controls a motion of the object 10 based on a relative position of the operating unit 200 to the main body 100.

For example, the control unit 300 may set a relative initial position (zero point) between the operating unit 200 and one surface of the main body 100 based on the user's preset input inputted to the user input unit 120. Specifically, because the users may have different hand sizes, a position at which the operating unit 200 is comfortably placed on an upper portion of the main body 100 may vary when the user holds the main body 100 in a state in which the finger is inserted into the operating unit 200. In this case, the mark needs to be formed at a position where the operating unit 200 may be placed, but it may be difficult for the user to accurately dispose his/her operating unit 200 at the position. Therefore, when the user performs a preset input to the user input unit 120 in a state in which the operating unit 200 is comfortably disposed on the upper portion of the main body 100, the control unit 300 may recognize a relative distance between the operating unit 200 and the main body 100 at this time as a basic distance, that is, a relative initial position.

In addition, the control unit 300 sets a relative initial position of the operating unit 200 to the main body 100, and then may perform calibration, based on the relative initial position, on at least one of an X-axis, a Y-axis, and a Z-axis of the operating unit 200 in accordance with the preset input. Specifically, when the user slowly moves the finger in the X-axis, Y-axis, and Z-axis directions in a state of the relative initial position, the control unit 300 determines a displacement and a trajectory as the user's displacement and trajectory, and determines a control operation based on the user's displacement and trajectory.

Meanwhile, in a case in which the operating unit 200 and the upper portion of the main body 100 deviate from the preset displacement, the control unit 300 may generate a maintaining signal for maintaining the object 10 at the current position. Specifically, in some instances, the main body 100 may be withdrawn from the user's hand in a state in which the user wears the operating unit 200 on the finger. Because the main body 100 and the operating unit 200 are moved away from each other at a great displacement during a process in which the main body 100 falls, the control unit 300 may determine this situation as an upward movement signal of the drone if the drone is in operation. To prevent this situation, in a case in which the previously measured relative initial position and the calibrated value deviate from the preset value, it is possible to generate a maintaining signal, that is, a shut-down signal for still maintaining the object 10 at the position where the object 10 is positioned.

In addition, the control unit 300 may include a sync function for setting a control signal of the main body 100 so that the control unit 300 may communicate with other objects 10 so as to be able to control a new object 10 based on the user's preset input. Specifically, the operation may be performed by synchronizing the new object 10 (e.g., objects in computer programs, vehicles, etc.) with the object controller 1000. In this case, it is possible to synchronize the new object 10 and the object controller 1000 by performing the preset input to the user input unit 120.

In addition, based on the preset user input, the control unit 300 may set transmission of the communication unit 140 to an OFF state so as to maintain a hovering state of the object 10.

Figure 4:
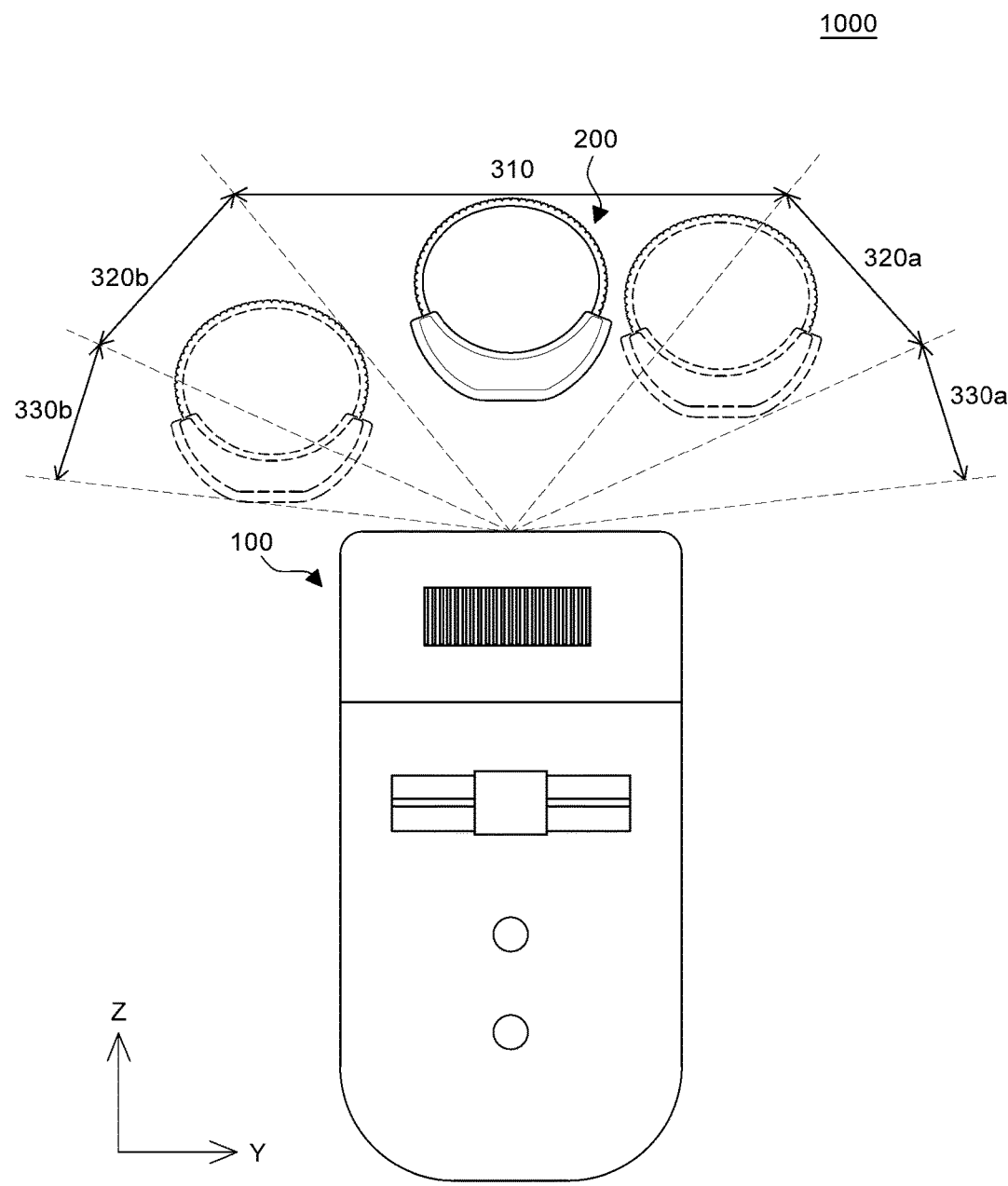
FIG. 4 is a conceptual view for explaining a state in which the object controller in FIG. 2 recognizes a recognition region of an operating unit.

FIG. 4 is a conceptual view for explaining a state in which the object controller in FIG. 2 recognizes a recognition region of the operating unit.

Referring to FIG. 4, it can be seen that a region in which the operating unit 200 moves relative to the main body 100 is divided in the Y-axis direction. Because it is difficult to minutely adjust the operating unit 200 when the user moves the operating unit 200 in a state in which the user wears the operating unit 200, these regions are designated, and an output of the control unit 300 may be divided into several steps. The division of the region reduces a probability of malfunction caused by the user's unexperienced operation or fatigue.

The regions may be set by the user's calibration step. Specifically, a length of a finger or feeling displacement in respect to a movement varies for each user. Therefore, when the object controller 1000 is used, a step of setting a relative initial position and calibrating and storing stepwise displacements with respect to the X-axis, the Y-axis, and the Z-axis may be performed. A specific explanation is as follows.

The user wears the operating unit 200, and holds the main body 100. Thereafter, the user sets a relative initial position through the user input unit 120 or the like. After the relative initial position is set, the object controller 1000 may automatically request the user to set stepwise displacements with respect to the X-axis, the Y-axis, and the Z-axis. For example, the object controller 1000 may output an output "Please move to the right by one step." to the user through the output unit 130. Thereafter, the object controller 1000 may output an output "Please move to the right by two steps." through the output unit 130. Therefore, the user move the operating unit 200 to the right by one step. Thereafter, the user moves the operating unit 200 to the right by two steps, that is, to the right further than the first step. By a method of repeating these processes, the regions with respect to the X-axis, the Y-axis, and the Z-axis may be set.

In more detail, settings of a first region 310, second regions 320a and 320b, and third regions 330a and 330b may vary in accordance with a size of the user's hand or the like. Therefore, the control unit 300 may perform the setting of the relative initial position and the calibration on the respective regions at the initial time when the object controller 1000 operates. The setting of the relative initial position and the calibration on the respective regions may be performed when a preset signal is inputted to the user input unit 120.

That is, the calibration of a signal determined by a relative displacement between the operating unit 200 and the main body 100 will be described below. The control unit 300 may set a relative initial position (zero point) between the operating unit 200 and one surface of the main body 100 based on the user's preset input inputted to the user input unit 120. After the relative initial position is set, the user may move the operating unit 200 with respect to at least one of the X-axis, the Y-axis, and the Z-axis of the operating unit 200. In this case, the sensor unit 110 and the control unit 300 may perform calibration by comparing a displacement of the operating unit 200 with the relative initial position.

Specifically, referring to FIG. 4, when the operating unit 200 is positioned in the first region based on the Y-axis, the control unit 300 may not generate a signal for moving the object 10 in the Y-axis direction. When the operating unit 200 is positioned in the second region, the control unit 300 generates a signal for moving the object 10 in the Y-axis direction at a predetermined speed. Further, when the operating unit 200 is positioned in the third region, the control unit 300 may generate a signal for moving the object 10 in the Y-axis direction at a speed higher than a movement speed generated in the second region. In this case, in a case in which the operating unit 200 is positioned in one region among the respective regions, the control unit 300 may generate a signal having the same magnitude for displacing the object 10. That is, when the operating unit 200 is positioned in one region, the control unit 300 outputs an output having the same magnitude, and thus, the object 10 may be moved.

Meanwhile, the region with respect to the respective axes may be divided into three or more regions or two regions. In addition, the region may be linearly set instead of being divided into a plurality of regions.

In addition, in a case in which a displacement with respect to one axis, among the X-axis, the Y-axis, and the Z-axis of the operating unit 200, is greater than displacements with respect to the remaining two axes by a preset range, the control unit 300 may set displacement values with respect to the two axes of the object 10 to 0. For example, when the user moves in a state in which the operating unit 200 is attached to the user's thumb, it is difficult for the operating unit 200 to linearly move with respect to the X-axis, the Y-axis, and the Z-axis due to a joint and a structure of the finger. Therefore, in a case in which a displacement with respect to one axis, among the X-axis, the Y-axis, and the Z-axis, is greater than displacements with respect to the remaining two axes by a preset range, the object 10 may be set to be moved only along the axis of which the displacement is greater than the preset range.

In this case, based on a calibration value, the control unit 300 generates a signal for moving the object 10 based on a displacement between the operating unit 200 and one side of the main body. However, the present invention is not limited thereto, the control unit 300 may generate a signal for moving the object 10 based on a reference value other than the calibration value. In this case, the reference value may be a value newly calculated by reflecting an error range to the calibration value.

FIGS. 5A to 5D are conceptual views for explaining various examples of an operating method of controlling the object by using the object controller in FIG. 2.

Figure 5A:
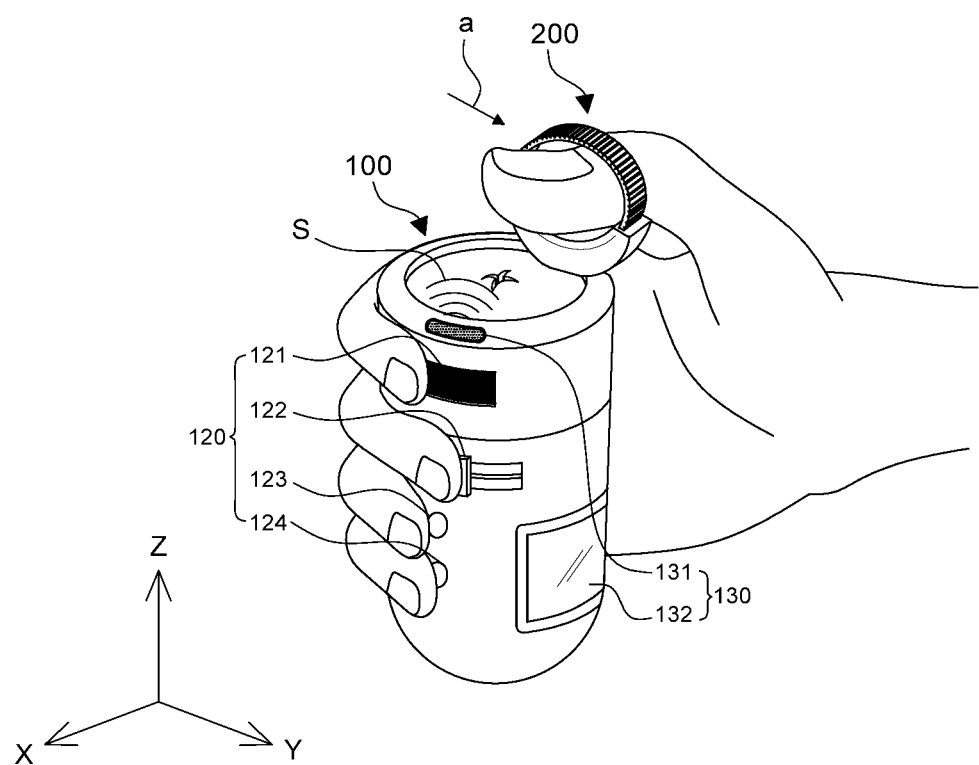
FIGS. 5A to 5D are conceptual views for explaining various examples of an operating method of controlling an object by using the object controller in FIG. 2.
Figure 5A:
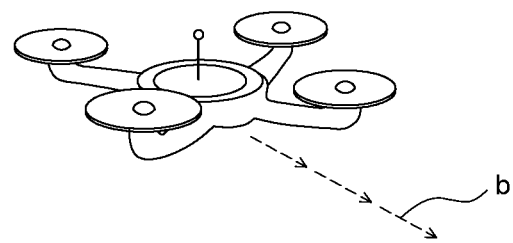

First, FIG. 5A illustrates a state in which the object controller 1000 moves the object 10 in a relative coordinate mode. The user moves the operating unit 200 in a first direction by a vector value of the arrow a. In this situation, the object 10 is continuously moved in the first direction by the vector value of a. It may be considered that the object controller 1000 moves the object 10 in the relative coordinate mode.

Specifically, the operating unit 200 of the object controller 1000 is moved in the first direction by a distance of a in the relative coordinate mode. Therefore, the object 10 is moved in the first direction at a speed proportional to an absolute value of the distance of a (or a speed having a value to which a predetermined ratio is applied). That is, in the relative coordinate mode, the object 10 continuously travels at a speed proportional to a.

Figure 5B:
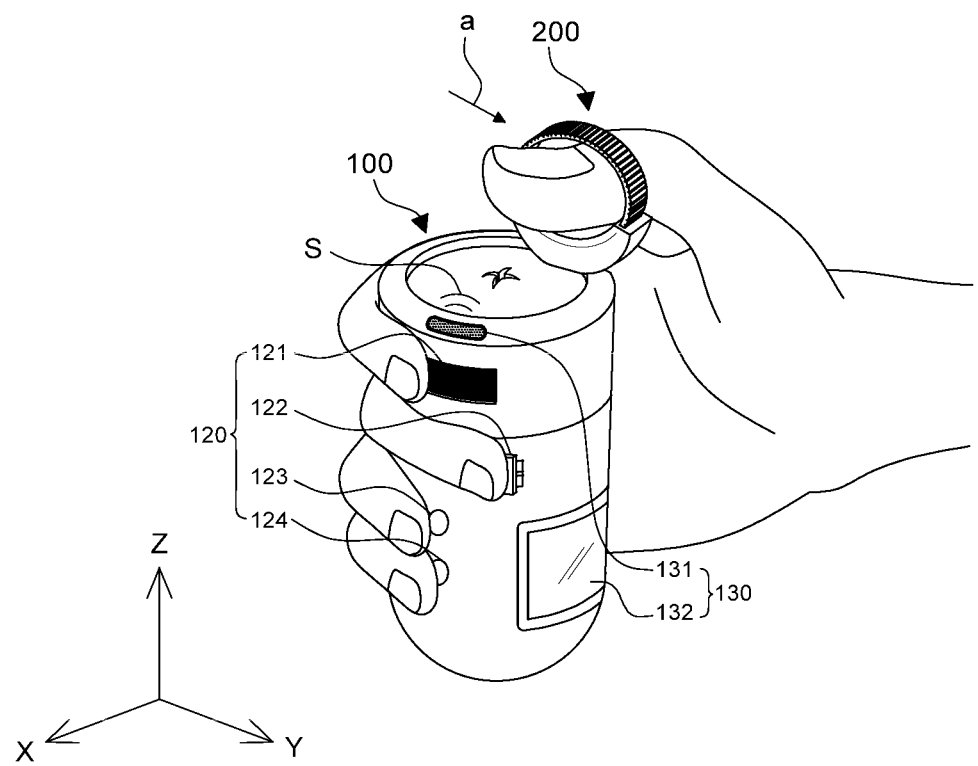
Figure 5B:
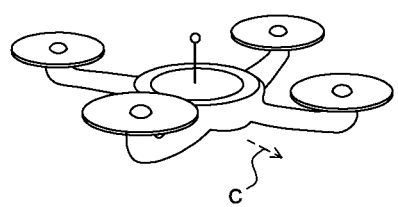
Figure 5C:
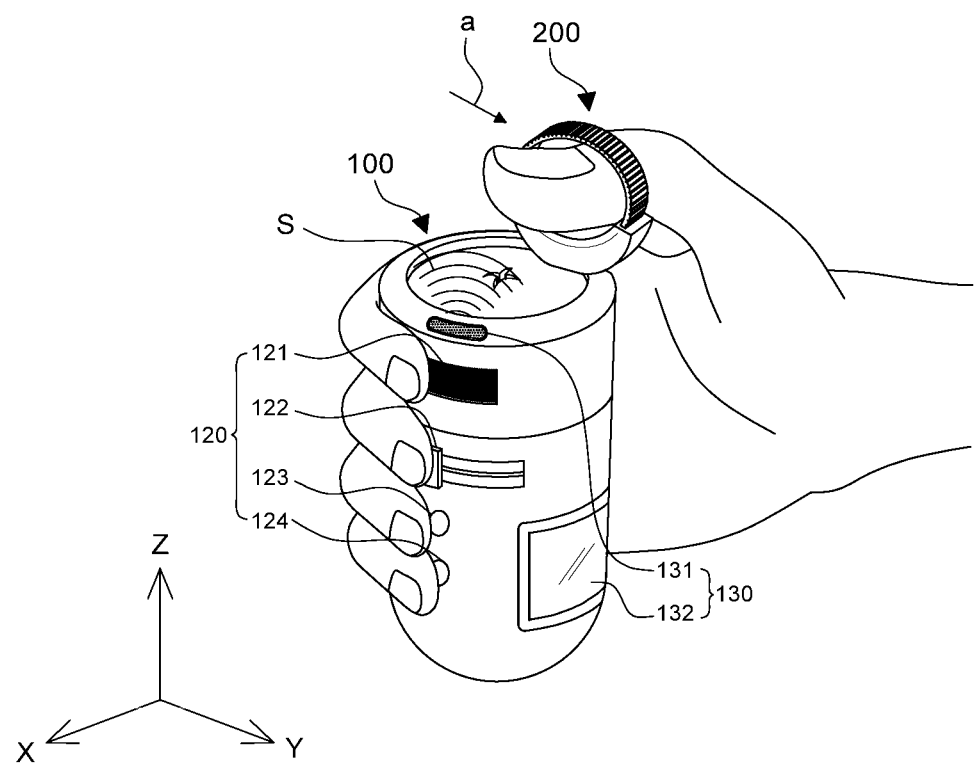
Figure 5C:
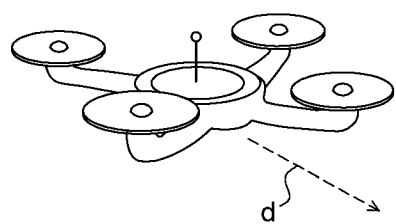

Next, FIGS. 5B and 5C illustrate a state in which the object controller 1000 moves the object 10 in an absolute coordinate mode. In both cases, the user moves the operating unit 200 in the first direction by the vector value of the arrow a. In this case, in FIG. 5B, the object 10 is moved in the first direction by a vector value of c. Further, in FIG. 5C, the object 10 is moved in the first direction by a vector value of d.

First, in the absolute coordinate mode, the object 10 is stopped after the object 10 is moved by an output corresponding to a degree to which the operating unit 200 is moved. Therefore, in FIG. 5B, the object 10 is stopped after the object 10 is moved in the first direction by the vector value of c. Further, in FIG. 5C, the object 10 is stopped after the object 10 is moved in the first direction by the vector value of d.

Further, based on the user's preset input to the user input unit 120, the control unit 300 may decrease or increase a ratio to a magnitude which displaces the object 10 which occurs in the respective regions. Specifically, the object 10 may be adjusted to be moved by a value made by applying a predetermined ratio to a relative displacement of the operating unit 200 in the user input unit 120. For example, when a second user input key 122 in FIG. 5B is pushed in any one direction, the object 10 may be moved by a relatively small vector value. Further, in FIG. 5C, the second user input key 122 is not pushed in any one direction. In this case, the object 10 may be moved by a vector value made by multiplying a distance, by which the operating unit 200 is moved, by a value relatively greater in comparison with a value in FIG. 5B.

Figure 5D:
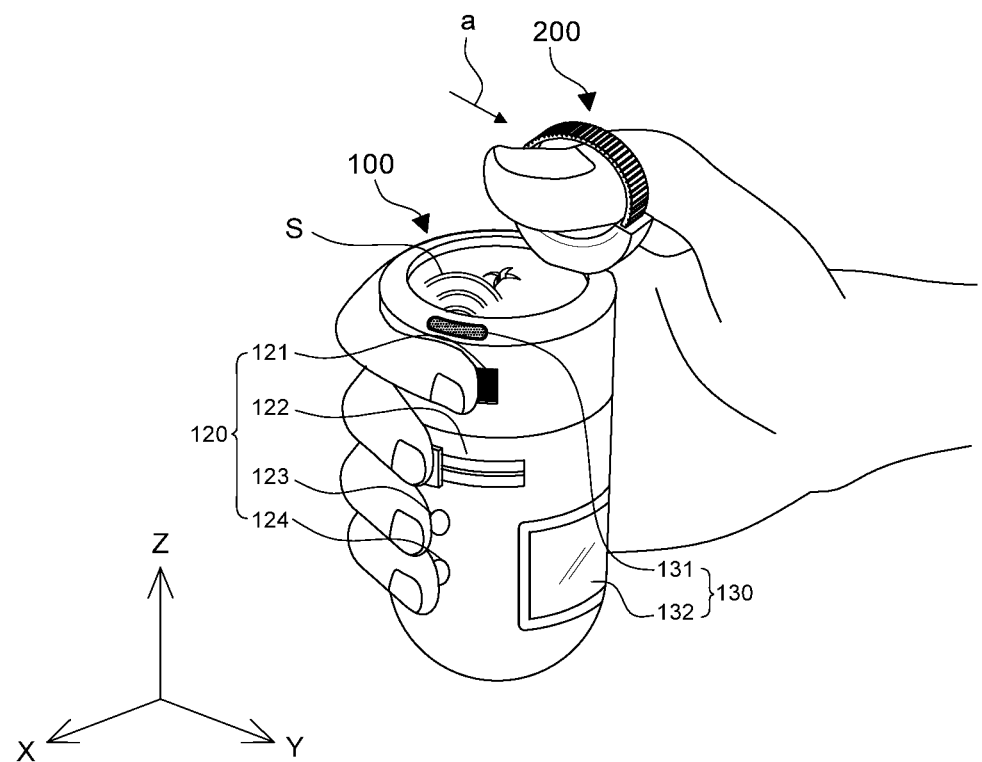
Figure 5D:
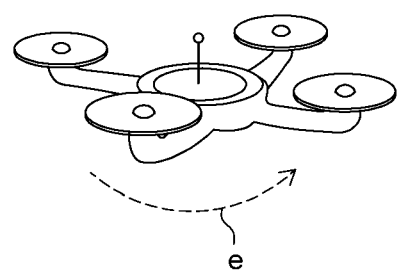

Next, FIG. 5D illustrates a state in which the object 10 is rotated by using the object controller 1000. The control unit 300 may generate a signal for rotating the object 10 based on the user's preset input to the user input unit 120.

Specifically, a first user input key 121 is configured as a wheel key. In this case, when the wheel key is rotated, the object 10 may be rotated in the corresponding direction. Even in this case, the object controller 1000 may control the movement of the object 10 in the relative coordinate mode or the absolute coordinate mode.

The relative coordinate mode and the absolute coordinate mode may be changed when a predetermined operating method, among various operations such as a push operation, the number of push operations, a time for the push operation is applied to the first to fourth user input keys 121, 122, 123, and 124.

Meanwhile, to enable the user to easily recognize a magnitude of a signal for controlling the object 10, the control unit 300 may generate at least one of an acoustic signal, a visual signal, and a tactile signal which vary in accordance with a signal generated to control the object 10. That is, this change may be outputted through the output unit 130 so as to be recognized by the user. For example, in FIG. 5A, in the case of the relative coordinate mode, sound with middle intensity may be outputted through the speaker 131. In addition, in FIGS. 5B and 5C which illustrates the absolute coordinate mode, the intensity of sound may be determined to be correspond to a magnitude of the vector by which the object 10 is moved. In addition, in FIG. 5D which illustrates a rotation mode, sound may periodically occur. However, a visual output through the display 132 is enabled, and a tactile output using vibration is enabled.

Figure 6A:
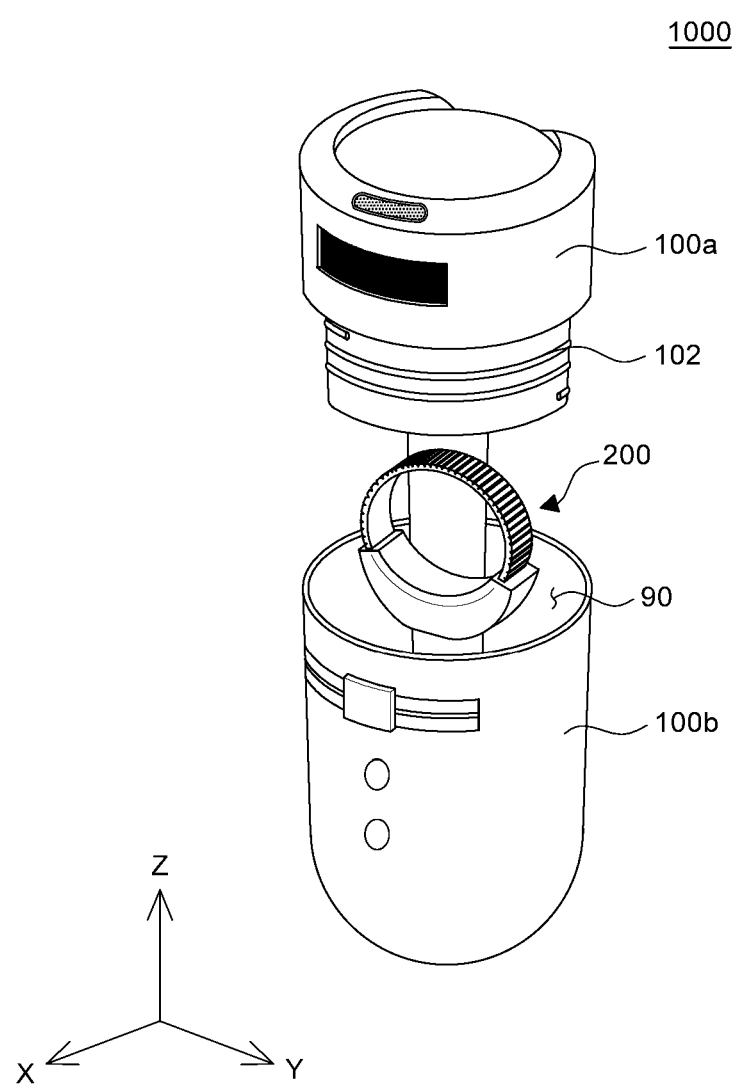
FIGS. 6A and 6B are conceptual views for explaining a state in which operating units are accommodated in main bodies in object controllers according to different exemplary embodiments of the present invention.
Figure 6B:
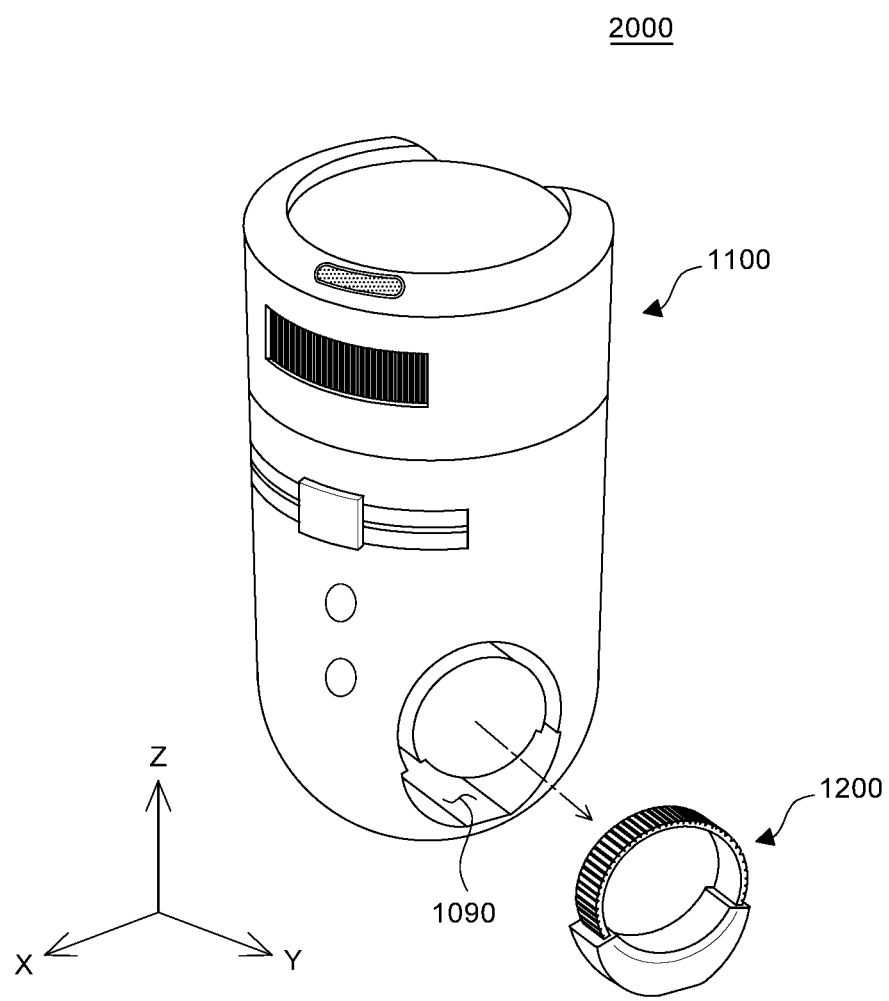

FIGS. 6A and 6B are conceptual views for explaining a state in which operating units are accommodated in main bodies in object controllers according to different exemplary embodiments of the present invention.

The main body 100 of the object controller 1000 of the present invention may include an accommodating space 90 which may accommodate the operating unit 200. Specifically, the accommodating space 90 may be formed in the main body 100 so as to accommodate the operating unit 200, or may be formed outside the main body 100 so that the operating unit 200 is detachably fitted with the accommodating space 90.

For example, referring to FIG. 6A, the main body 100 may be formed to be divided into an upper main body 100 and a lower main body 100. A screw thread is formed on the upper main body 100, such that the upper main body 100 may be coupled to or separated from the lower main body 100 by a relative rotation between the upper main body 100 and the lower main body 100. However, the present invention is not limited to the coupling manner.

When the upper main body 100 and the lower main body 100 are separated from each other, an internal space is formed in the lower main body 100. The operating unit 200 may be accommodated in the internal space. However, the present invention is not limited to the configuration in which the internal space is formed in the lower main body 100, and an internal space may be formed in the upper main body 100.

Next, referring to FIG. 6B, an accommodating space 1090 is recessed in the main body 1100 of the object controller 2000. The accommodating space 1090 may be formed corresponding to a shape of the operating unit 1200 so that the operating unit 1200 may be seated in the accommodating space 1090. In addition, an anti-withdrawal member may be further provided to prevent the operating unit 1200 from being easily withdrawn after the operating unit 1200 is seated and accommodated.

Figure 7A:
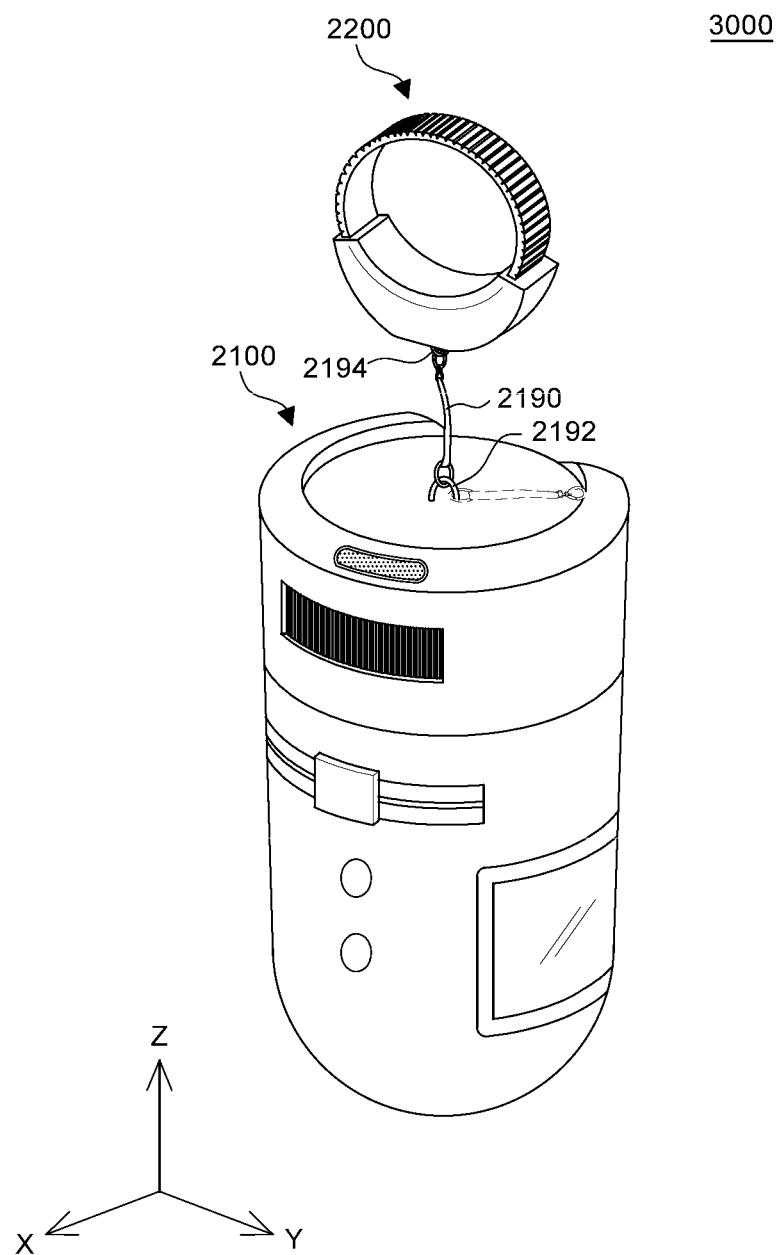
FIGS. 7A to 7C are perspective views for explaining object controllers according to different exemplary embodiments of the present invention.
Figure 7B:
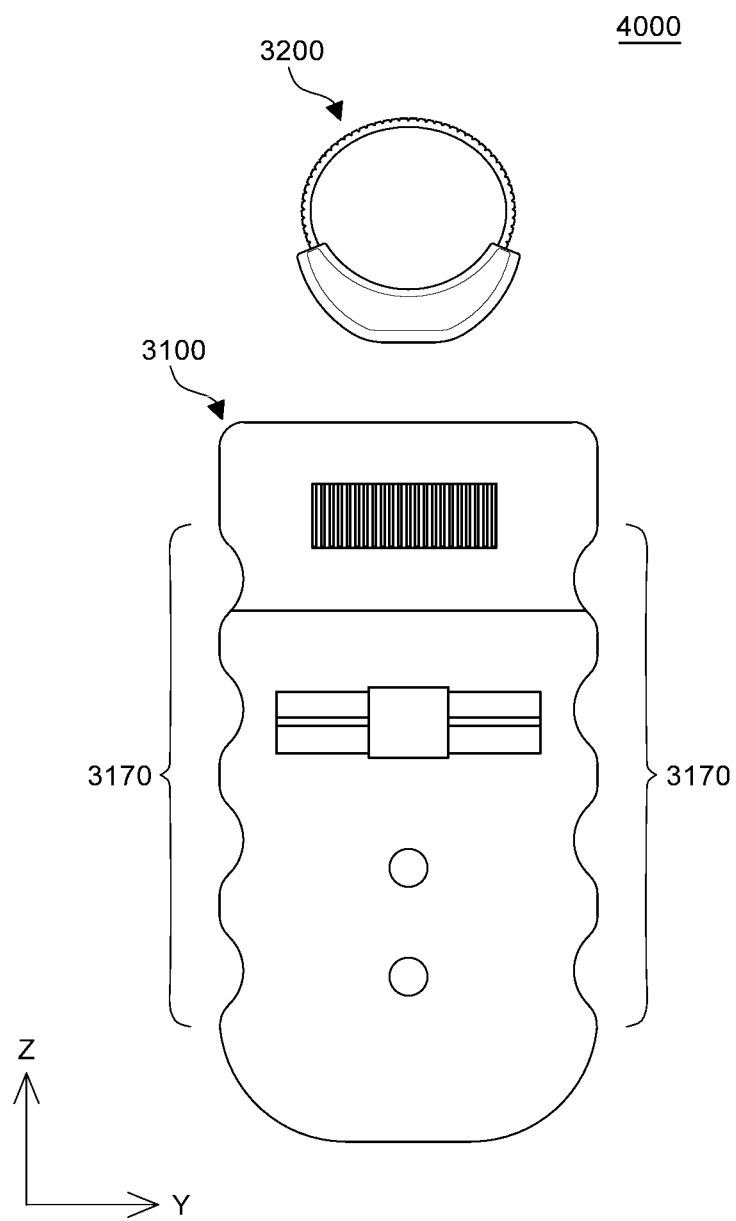
Figure 7C:
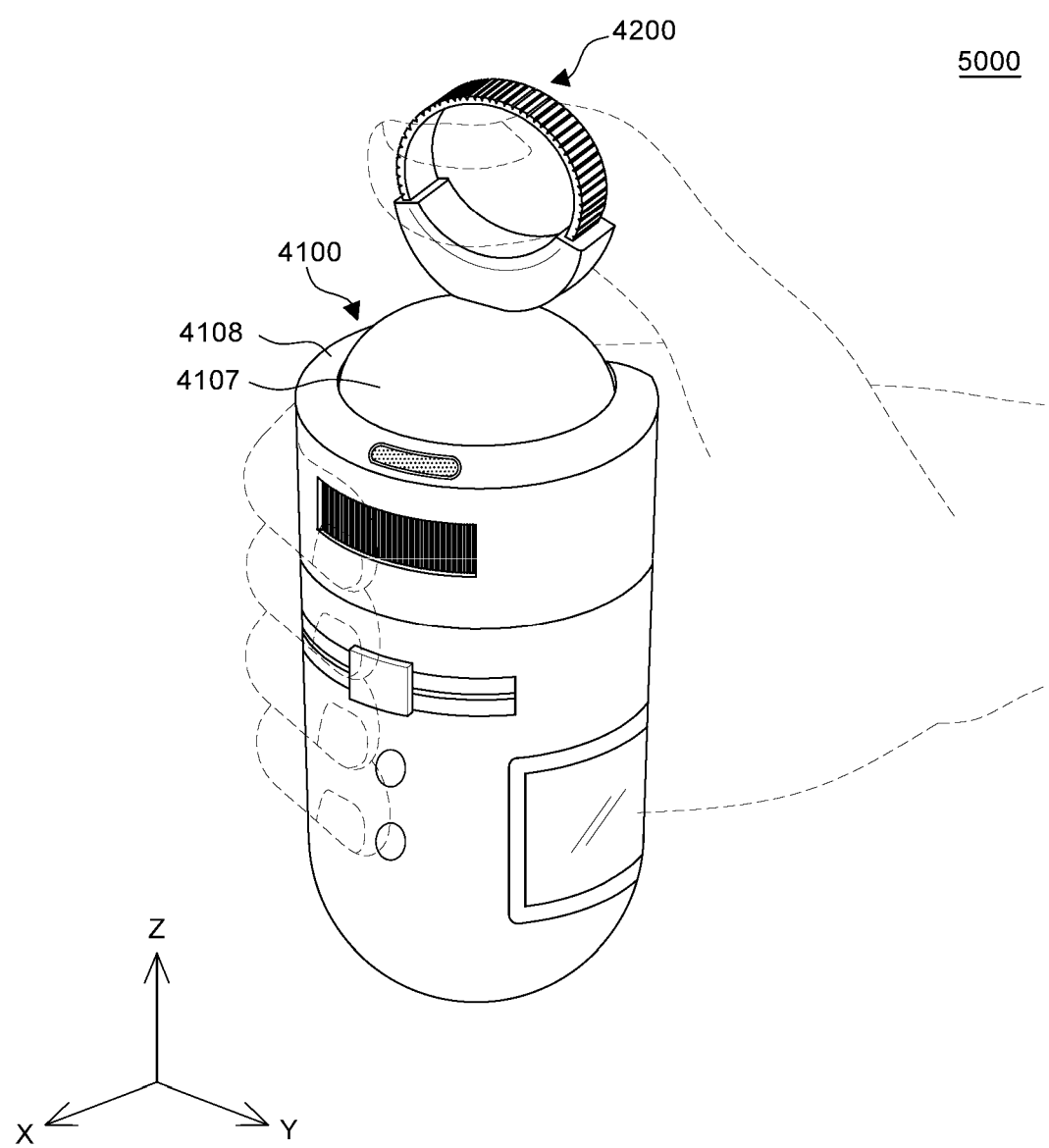

FIGS. 7A to 7C are perspective views for explaining object controllers according to different exemplary embodiments of the present invention.

First, referring to FIG. 7A, a main body 2100 may include a connecting member which may be formed on an upper surface of the main body 2100 and may be coupled to an operating unit 2200 so that the operating unit 2200 is not withdrawn from the main body 2100 while the operating unit is in operation. The connecting member may be connected to a loop formed on the upper surface of the main body 2100. The connecting member may be coupled to a loop formed on the operating unit 2200 as well as the loop formed on the upper surface of the main body 2100.

The control unit may generate a maintaining signal for maintaining the object 10 at the current position in a case in which the operating unit 2200 and the upper portion of the main body 2100 deviate from a preset displacement or greater or external force at preset pressure or higher is applied to the main body 2100. The reason is to prevent the object 10 from being operated by a relative distance between the operating unit 2200 and the main body 2100 which have fallen on the floor when the user simultaneously miss the main body 2100 and the operating unit 2200 because it is difficult for the operating unit 2200 to be separated from the main body 2100 because of the connecting loop.

Meanwhile, the connecting member may merely connect the operating unit 2200 and the main body 2100, but information about control of the object 10 may be obtained by pressure applied to the loop 2192 of the main body 2100.

To enable the user to easily hold the main body 3100, the main body 3100 may have a strap that surrounds the user's hand, or a curved portion may be formed on an external shape of the main body 3100. Specifically, referring to FIG. 7B, curved portions 3170 are formed on the main body 3100. The curved portion 3170 may not only guide a position at which the user's finger is positioned on the main body 3100, but also enable the user's hand and the main body 3100 to easily come into close contact with each other. That is, since the user's hand is inserted into the curved portion 3170 and comes into close contact with the curved portion 3170, and as a result, a contact area between the user's hand and the main body 3100 is increased. Furthermore, the finger inserted into the curved portion 3170 may receive force which causes the main body 3100 to fall down by gravity, and as a result, supporting force for supporting the main body 3100 may be increased.

Next, referring to FIG. 7C, an upper surface of a main body 4100 may convexly protrude toward the outside. The protruding surface is referred to as a support surface 4107. An operating unit 4200 may be movably supported on the support surface 4107. The user is spaced apart from an upper portion of the main body 4100 by the support surface 4107, and as a result, it is possible to reduce fatigue when the user operates the operating unit 4200. In addition, with the support surface 4107, it is possible to comparatively constantly maintain a separation distance between the operating unit 4200 and the main body 4100. In addition, elaboration may be increased when the user controls the object 10 by means of the operating unit 4200.

In addition, the support surface 4107 may be pushed when the support surface 4107 is pressed toward a central portion of the main body 4100 at a predetermined pressure or higher. That is, when the support surface 4107 is pressed toward the central portion of the main body 4100 (−Z-axis in the coordinate), the support surface 4107 itself may be pushed downward by a displacement to a designed predetermined degree. With the aforementioned operations of the operating unit 4200 and the support surface 4107, it is possible to generate a signal for moving the object 10 downward.

Meanwhile, the main body 4100 may include an anti-withdrawal projection which protrudes on the support surface 4107 along a circumference of the upper portion of the main body 4100. The anti-withdrawal projection prevents the operating unit 4200 from being moved to the outside of the main body 4100 while the operating unit 4200 is in operation.

Figure 8:
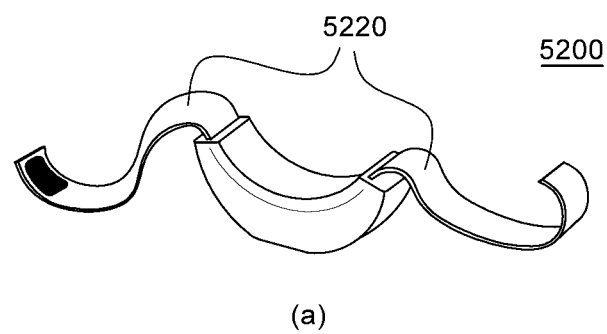
FIG. 8 is a conceptual view for explaining operating units according to different exemplary embodiments of the present invention.
Figure 8:
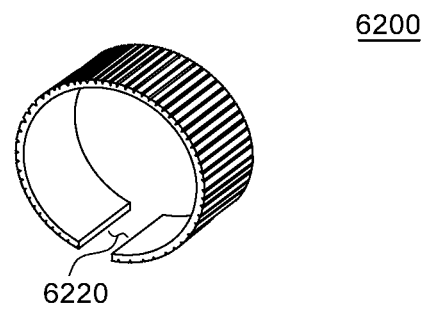
Figure 8:
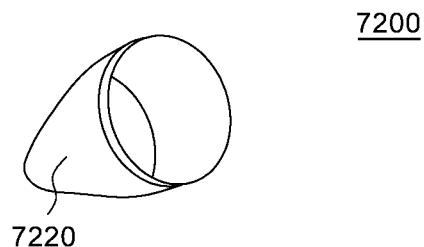

FIG. 8 is a conceptual view for explaining operating units according to different exemplary embodiments of the present invention.

An operating unit 6200 of the present invention may include at least one of a holding means, a tightening means 5220, and a fitting means 7220 so that the operating unit 6200 may be attached to and detached from the user's finger.

First, FIG. 8A illustrates an exemplary embodiment in which the operating unit 6200 includes the tightening means 5220 configured as a strap. The user disposes the finger inside the operating unit 6200, and then connects and couples both sides of the tightening means 5220.

FIG. 8B illustrates an exemplary embodiment in which an operating unit 6200 holds the user's finger by pressing the user's finger by using restoring force. The operating unit 6200 has a ring shape which is partially cut out. A diameter of the operating unit 6200 is small, and as a result, the operating unit 6200 may hold the user's finger by using restoring force.

FIG. 8C illustrates an exemplary embodiment in which the operating unit 7200 includes a fitting means 7220 which may be tightened corresponding to a thickness of the user's finger.

Figure 9:
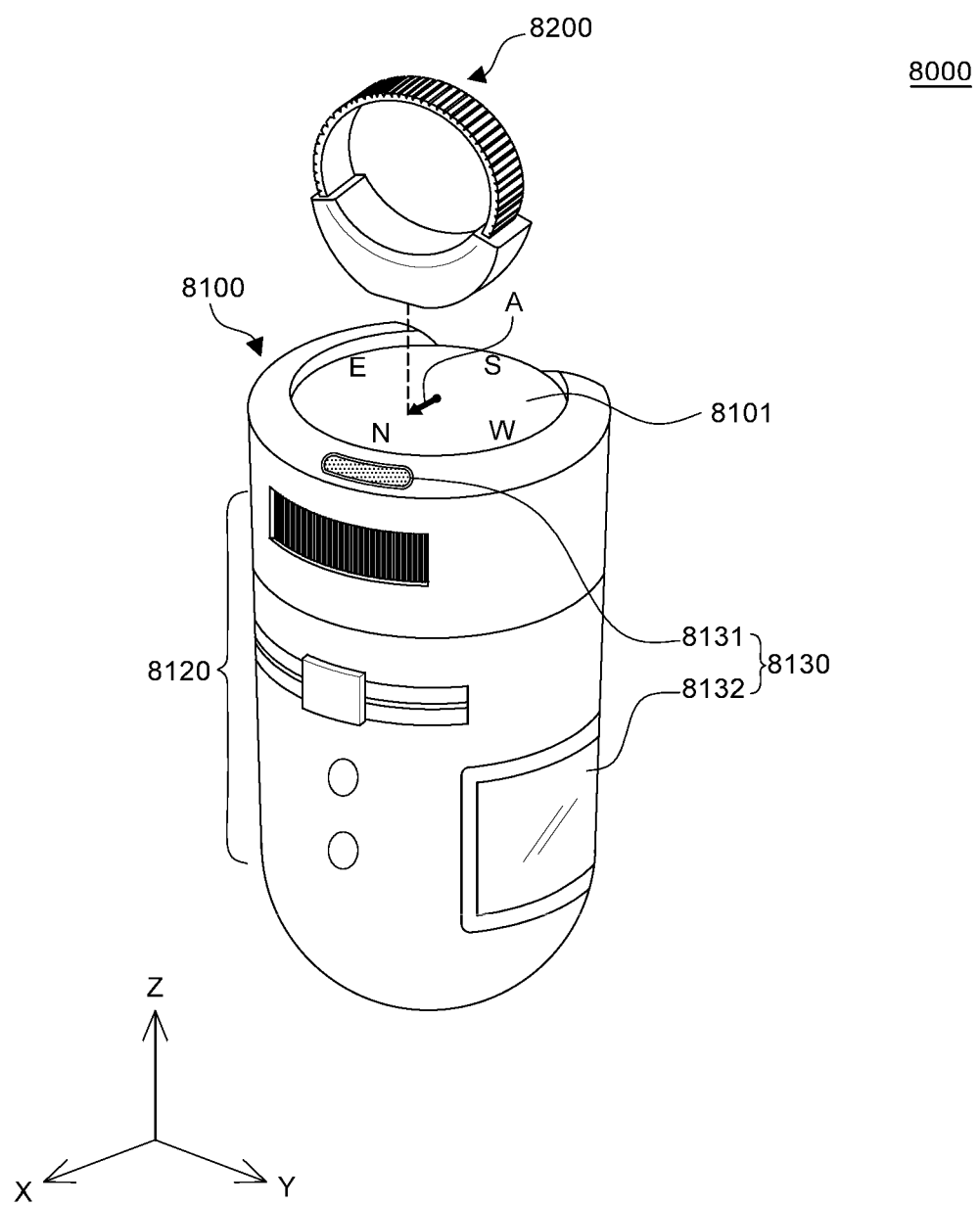
FIG. 9 is a conceptual view for explaining an object controller according to another exemplary embodiment of the present invention.

FIG. 9 is a conceptual view for explaining an object controller according to another exemplary embodiment of the present invention.

An upper surface display 8101 is disposed on an upper portion of the main body 8100, and information such as a position and a traveling direction of the operating unit 8200 may be displayed on the upper surface display 8101.

Specifically, referring to FIG. 9, the upper surface display 8132 is disposed on the upper portion of the main body 8100. A center point may be displayed on the display 8132. The center point is a dot which is displayed when the operating unit 8200 is disposed on the upper portion of the main body 8100.

In this case, a small size of the center point means a long vertical distance between the main body 8100 and the operating unit 8200, and a large size of the center point means a short vertical distance between the main body 8100 and the operating unit 8200. In a case in which a size of the center point is equal to or smaller than a predetermined size, that is, in a case in which a vertical distance between the main body 8100 and the operating unit 8200 is long, a signal for moving the object 10 upward may be transmitted. In a case in which a size of the center point is equal to or greater than a predetermined size, that is, in a case in which a vertical distance between the main body 8100 and the operating unit 8200 is short, a signal for moving the object 10 downward may be transmitted. In addition, an arrow A of the display 8132 may visually indicate a vector value in respect to a movement direction and a movement speed of the drone.

Although the exemplary embodiments of the present invention have been described in detail with reference to the accompanying drawings, the present invention is not limited thereto and may be embodied in many different forms without departing from the technical concept of the present invention. Therefore, the exemplary embodiments of the present invention are provided for illustrative purposes only but not intended to limit the technical concept of the present invention. The scope of the technical concept of the present invention is not limited thereto. The protective scope of the present invention should be construed based on the following claims, and all the technical spirit in the equivalent scope thereto should be construed as falling within the scope of the present invention.

The invention claimed is:

1. An object controller capable of controlling a motion of an object, the object controller comprising:
   a main body;
   an operating unit which is in non-contact with the main body; and
   a control unit which is disposed in the main body, and controls a motion of the object in a X-axis, a Y-axis, and a Z-axis based on a relative position, including at least one of the X-axis, the Y-axis, and the Z-axis directions, of the operating unit with respect to the main body,
   wherein:
   the main body includes a user input unit which enables the user to input a signal so as to perform another control on the object in addition to the operation according to a relative position between the operating unit and the main body,
   the object moves in the Z-axis direction according to a distance between the operating unit and the main body in the Z-axis direction, and
   the object is at least one of drones, unmanned aerial vehicles, manned aerial vehicles, and vehicles.

2. The object controller of claim 1, wherein the main body is formed to enable a user to easily hold the main body.

3. The object controller of claim 1, wherein a display is disposed on an upper portion of the main body, and
   the display displays a position and a travel direction of the operating unit.

4. The object controller of claim 1, wherein an upper portion of the main body convexly protrudes toward the outside so as to form a support surface.

5. The object controller of claim 4, wherein the operating unit is movably supported on the support surface and the support surface is pushed when the support surface is pressed at a predetermined pressure or higher toward a central portion of the main body.

6. The object controller of claim 1, wherein the main body includes an anti-withdrawal projection which protrudes on the support surface along a circumference of the upper portion of the main body.

7. The object controller of claim 1, wherein the control unit sets a relative initial position (zero point) between the operating unit and one surface of the main body based on the user's preset input inputted to the user input unit.

8. The object controller of claim 1, wherein the control unit sets a relative initial position of the operating unit to the main body, and performs and stores linear calibration on at least one of an X-axis, a Y-axis, and a Z-axis in respect to a motion of the operating unit that moves based on the relative initial position in accordance with a preset input.

9. The object controller of claim 8, wherein the control unit generates a signal for moving the object based on a displacement between the operating unit and one side of the main body based on an initial position set value and a reference value made by performing calibration.

10. The object controller of claim 9, wherein the control unit divides a displacement degree between the operating unit and one side of the main body into two or more regions or linearly receives the displacement degree, and generates a signal having the same magnitude for displacing the object when the operating unit is positioned in one of the respective regions.

11. The object controller of claim 8, wherein when a displacement with respect to one axis, among the X-axis, the Y-axis, and the Z-axis of the operating unit, is greater than displacements with respect to the remaining two axes by a preset range or larger, the control unit sets displacement values with respect to the two axes of the object to 0.

12. The object controller of claim 10, wherein the control unit decreases or increases a ratio to a magnitude which displaces the object which occurs in respective regions based on the user's preset input to the user input unit.

13. The object controller of claim 9, wherein the control unit generates at least one of an acoustic signal, a visual signal, and tactile signal which vary in accordance with a signal generated to control the object in order to enable the user to easily recognize a magnitude of a signal for controlling the object.

14. The object controller of claim 7, wherein the control unit generates a signal for maintaining the object at the current position when the operating unit and the upper portion of the main body deviate from a preset displacement or greater or external force at preset pressure or higher is applied to the main body.

15. The object controller of claim 1, wherein the main body includes an accommodating space which accommodates the operating unit.

16. The object controller of claim 15, wherein the accommodating space is formed in the main body so as to accommodate the operating unit or formed outside the main body so that the operating unit is detachably fitted with the accommodating space.

17. The object controller of claim 1, wherein the main body includes a connecting member which is formed on an upper surface of the main body and coupled to the operating unit so that the operating unit is not withdrawn from the main body while the operating unit is in operation.

18. The object controller of claim 1, wherein the user input unit includes at least one of a scroll button, a wheel button, a slide button, and a push button.

19. The object controller of claim 18, wherein the control unit generates a signal for rotating the object based on the user's preset input to the user input unit.

20. The object controller of claim 1, wherein the operating unit includes, so as to be attached to and detached from the user's finger, at least one of a holding means which is held by the user's finger while pressing the user's finger by using restoring force so as to be attached to or detached from any one of the user's fingers, a tightening means which is tightened in accordance with a thickness of the user's finger, and a fitting means into which the finger is inserted.

21. The object controller of claim 1, further comprising:
a communication module which transmits and receives information about the object, information about a control signal, and a signal for setting the main body to and from an external terminal.

22. The object controller of claim 1, wherein the main body further includes a display which displays information about the object, information about a control signal, and a signal for setting the main body.

23. The object controller of claim 1, wherein the control unit includes a sync function for setting a control signal of the main body so that the control unit communicates with other objects so as to control a new object based on the user's preset input.

24. The object controller of claim 1, wherein a relative position of the operating unit to the main body is detected by using a position sensor.

25. The object controller of claim 1, wherein the control unit generates a signal for at least one of roll, pitch, and yaw to rotate the object about two or more of X, Y, and Z-axes of movement.

* * * * *